Jan. 18, 1949. LE ROY M. KUBAUGH 2,459,741
RESILIENT MOUNTING
Original Filed Oct. 27, 1942 2 Sheets-Sheet 1

Inventor
LEROY M. KUBAUGH
By Ely & Frye
Attorneys

Jan. 18, 1949.　　LE ROY M. KUBAUGH　　2,459,741
RESILIENT MOUNTING

Original Filed Oct. 27, 1942　　2 Sheets-Sheet 2

Inventor
LEROY M. KUBAUGH
By Ely & Frye
Attorneys

Patented Jan. 18, 1949

2,459,741

UNITED STATES PATENT OFFICE 2,459,741

RESILIENT MOUNTING

Le Roy M. Kubaugh, Akron, Ohio, assignor to The Firestone Tire & Rubber Company, Akron, Ohio, a corporation of Ohio Original application October 27, 1942, Serial No. 463,505, now Patent No. 2,367,830, dated January 23, 1945. Divided and this application August 21, 1944, Serial No. 550,449

3 Claims. (Cl. 248—358)

This invention relates to resilient mountings and more especially it relates to improved resilient mountings comprising rubber such as are used for vibration insulators or for other yielding or flexible connections interposed between supporting and supported structures.

The chief objects of the invention are to provide in an improved manner for reducing the sag or permanent set of the rubber element or elements of resilient mountings of the character mentioned; to increase the capability of static deflection of the mounting and thereby to reduce its natural frequency of vibration. More specifically the invention aims to provide a simple means for obtaining pre-compression of the rubber structure of resilient mountings of the character mentioned and thereby to achieve the attendant benefits of such pre-compression; and to provide means whereby the amount of pre-compression of the rubber may be changed.

For illustrative purposes, the invention will be shown and described with relation to the resilient mounting shown in Fig. 4 of U. S. Patent No. 2,047,493 to Curt Saurer, issued July 14, 1936, upon which mounting the present invention is an improvement.

This application is a division of my copending application, Serial No. 463,505 filed October 27, 1942, now Patent No. 2,367,830.

Resilient mountings of the character mentioned commonly are used for supporting vibratory structures upon non-vibratory structures, such as the mounting of an electrical motor or an internal combustion engine upon a floor or ceiling. Also they are used for mounting a vehicle motor upon the frame of the vehicle. In either case an important function of the mounting is to absorb and/or suppress the motor vibrations and prevent or retard their transmission to the supporting structure. Although prior rubber mountings, such as the Saurer mounting aforementioned, have given excellent all-around performance, they were believed to be capable of improvement in their vibration-dampening characteristic, that is, their transmissibility could be decreased.

The improving of the prior resilient mountings according to the present invention is based on the theory that:

The natural frequency of a rubber mounting is given closely by the formula $$f_n = \frac{3.13}{\sqrt{d}}$$

cycles per second wherein $f_n$=natural or resonant frequency, and $d$=deflection in inches under static load.

Transmissibility is given by:

$$E = \frac{1}{\left(\frac{fd}{fn}\right)^2 - 1}$$

wherein $E$=transmissibility and $fd$=the disturbing frequency. These formulae clearly show that in order to decrease transmissibility, the $f_n$ should be as low as possible, and that the static deflection per unit load should be as great as possible consistent with required stability, allowable stresses in the rubber etc. In applying the theory of the invention to a specific rubber vibration insulator, the aforementioned Saurer mounting is employed, and said mounting, in normal condition, is deformed and narrowed by laterally directed pressure so that the rubber elements thereof have a determinate amount of precompression. The term "pre-compression" as used herein refers to compressive stress of the rubber elements, maintained by the other elements of the mounting, irrespective of the stresses placed thereon by the structure supported thereby.

Figure 3:
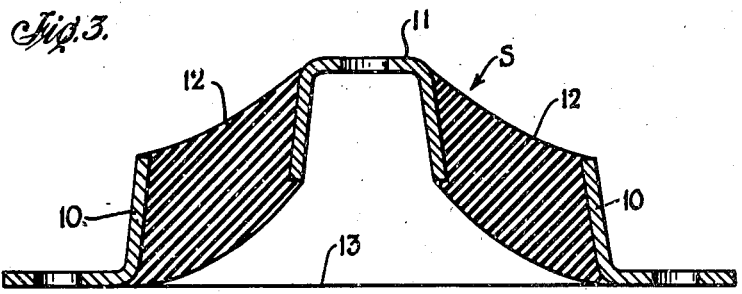
Fig. 3 is a transverse section through the resilient unit of the mounting in the unstressed condition in which it is molded.

Referring to the drawings, there is shown in Fig. 3 thereof a transverse section of the Saurer resilient mounting aforementioned, the same being in normal unstressed condition. Said mounting is designated as a whole by the character S, and consists of parallel, spaced-apart, angular lateral strips 10, 10, composed of metal, a metal channel strip 11 positioned between the strips 10 and parallel thereto, the channel preferably being inverted so that its base is uppermost and the entire strip being somewhat elevated with relation to the strips 10, and cushions 12, 12 of resilient rubber vulcanized to the respective lateral faces of the channel and to the adjacent lateral faces of the respective angle strips 10. At least the bottom face of each cushion 12 is arcuate as shown, the arrangement being such that as the channel 11 is depressed or deflected during use the bottom face of each cushion progressively makes contact with the surface 13 of the supporting structure (not shown) upon which the lateral strips are mounted, with the result that the cushions offer progressively increasing resistance to such deflection. The structure may be of any length desired, but preferably is made in relatively long lengths so that shorter lengths may be cut therefrom. Both lateral strips 10 and the channel strip 11 are formed with bolt holes, as shown, to receive the bolts that secure them to a supporting structure and supported structure respectively. Preferably each angle strip 10 is so shaped that the included angle defined by the legs thereof is greater than 90 degrees, and said strips are so arranged that the upstanding legs thereof converge toward each other. The lateral legs of the channel 11 diverge from their common base, the arrangement being such that the channel legs and the adjacent legs of the lateral strips 10 are in substantial parallelism transversely as well as longitudinally.

Figure 1:
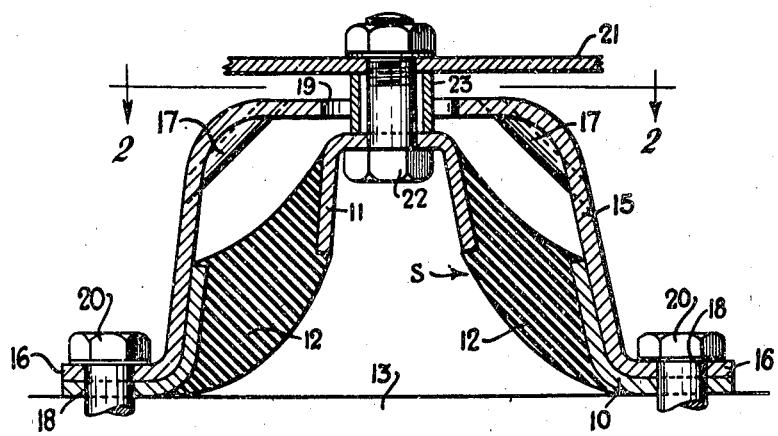
Fig. 1 is a transverse section through one embodiment of the invention, in operative association with a supporting structure and a supported structure.
Figure 2:
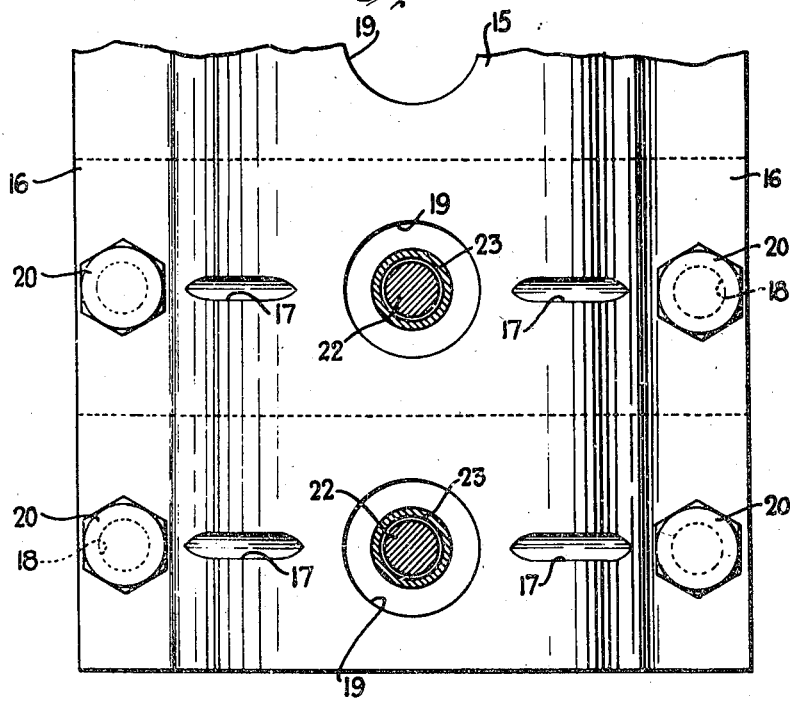
Fig. 2 is a plan view of the improved mounting as seen from line 2—2 of Fig. 1.

Referring now to Figs. 1 and 2 of the drawings, the resilient unit S is shown in combination with means by which pre-compression is imparted to the rubber elements thereof. As shown therein, said means consists of an inverted channel-like structure 15 having outwardly turned marginal flanges 16, 16. The depth of the channel structure 15 is somewhat greater than the height of the mounting S, and the greatest width of the channel of the structure is less than the greatest width of the mounting S between the upstanding legs of the lateral strips 10 thereof. Furthermore, the sides of the structure 15 diverge from the base thereof at substantially the same angle as the included angle between the respective legs of the said lateral strips 10 of the mounting S. Like the latter, the structure 15 may be made initially in a relatively long length, shorter lengths if required being cut therefrom, as indicated by the transverse broken lines, Fig. 2. The channel structure 15 is reinforced at spaced points throughout its length by re-entrant ribs or webs 17, 17 formed diagonally across the rounded corners at the juncture of its base portion with the respective sides of the structure. The flanges 16 of the structure 15 are formed with bolt holes 18 and the base of the structure is formed with a longitudinal series of centrally positioned apertures 19, 19. The ribs 17, the bolt holes 18, and the apertures 19 are in alignment transversely of the structure, and are so spaced longitudinally of the structure that the shortest practical length severed from the structure, as indicated by the broken lines in Fig. 2, will include at least one transverse series of said bolt holes, apertures and ribs. In an assembled mounting comprising a resilient unit S and a channel structure 15, the latter and said resilient unit are the same length.

In the assembling of the mounting, the structure 15 is forced down upon a unit S, or alternatively, the latter is forced into the channel of the structure 15. This operation readily is accomplished since the sides of the resilient unit S and the channel structure 15 are complementally sloped. Since the width of the channel structure is less than the width of the resilient unit, such telescoping of the members causes the structure 15 to exert a wedging effect against the outwardly directed lateral faces of the strips 10 of the unit S, and thereby to move said strips laterally toward each other and toward opposite sides of the channel 11, and to elevate the latter somewhat above its normal position. This results in such deformation and deflection of the rubber bodies 12 of the resilient unit as to put said bodies under compressive stress, referred to herein as "pre-compression." When the channel 15 and unit S are fully telescoped, the flanges 16 of the channel are in juxtaposition with the laterally extending legs of the strips 10 of the unit S, and the bolt holes 18 of the channel are in registry with the bolt holes of said strips 10. Thus both elements may be secured to an underlying supporting structure 13 by bolts or cap screws 20 that extend through said aligned bolt holes. In the assembled mounting the bolt holes in the channel 11 of the resilient unit are in alignment with the apertures 19 of the channel structure 15. Thus a supported structure, shown at 21, may be secured to the channel of the resilient unit by means of a bolt or bolts 22 that extend through the said apertures 19, each bolt extending through a spacer sleeve 23 disposed between the channel 11 and the supported structure 21.

Because of the pre-compression imparted to the rubber bodies of the mounting, the tendency of the said bodies to sag or to take a permanent set is materially reduced. Furthermore, the rubber bodies have greater static deflection than they would have if not compressed, with the result that the natural frequency of vibration of the mounting is reduced. This fact is verified by the following test data made with a mounting 2 inches in length, the rubber bodies being of 40 durometer hardness as molded.

| Not compressed | | Under pre-compression | |
| --- | --- | --- | --- |
| Load | Deflection calculated | Load | Deflection calculated |
| 12 lbs | .050" 14.0 cycles/sec | 11.5 lbs | .050" 14.0 cycles/sec. |
| 22 lbs | .100" 9.9 cycles/sec | 21.5 lbs | .100" 9.9 cycles/sec. |
| 33 lbs | .150" 8.1 cycles/sec | 31.3 lbs | .150" 8.1 cycles/sec. |
| 42 lbs | .200" 7.0 cycles/sec | 39.0 lbs | .200" 7.0 cycles/sec. |
| 54 lbs | .250" 6.26 cycles/sec | 47.5 lbs | .250" 6.26 cycles/sec. |

The foregoing data clearly shows that the natural frequency of vibration is inversely proportional to the deflection under static load, and that the same deflection in a pre-compressed mounting may be obtained with a lighter static load than in an uncompressed mounting.

The invention provides in a simple manner for imparting pre-compression to a resilient mounting unit of the character described, whereby the attendant benefits of pre-compression are achieved.

Figure 4:
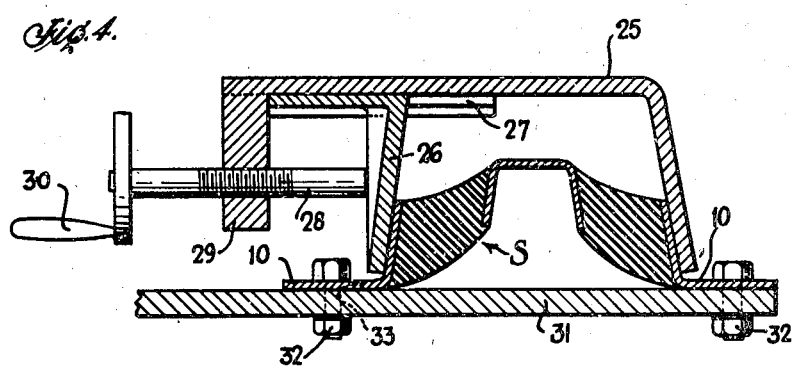
Figs. 4, 5 and 6 are transverse sections, on a smaller scale, of other embodiments of the invention.

In the embodiment of the invention shown in Fig. 4, the rubber bodies of the resilient unit S are placed under pre-compression by means of a channel-like structure of adjustable width, said structure comprising a major element 25 that constitutes the base and one side of the channel, and a minor element 26 that constitutes the other side of the channel. The major element is formed on its base portion, at the ends thereof, with respective slideways such as the slideway 27 that extends part way across said base as shown, the minor element 26 formed with tongues (not shown) that are slidably received in the respective slideways. The arrangement is such that the minor element 26 is movable relatively of the major element 25 to vary the width of the channel defined thereby. Adjustment of the position of the minor element 26 is effected by means of an adjusting screw 28 that is threaded through an ear or flange 29 formed integrally with the major element 25, the inner end of said screw bearing against the outwardly presented side of the minor element, the outer end of the screw provided with a handcrank 30. The sides of the channel defined by the elements 25 and 26 are divergent, and they engage the sides of the resilient unit S in the same manner as the channel structure 15 previously described except that they do not engage the laterally projecting legs of the angle strips 10 of the resilient unit. The resilient unit S is secured to a supporting structure 31 by bolts 32, 32, which bolts on one side of the structure extend through respective slots 33 formed in the supporting structure, transversely of the position of the mounting, to enable lateral movement of one strip 10 of the resilient unit relatively of the other lateral strip 10 thereof. The arrangement is such that any desired pre-compression may be imparted to the rubber bodies of the resilient unit.

Figure 5:
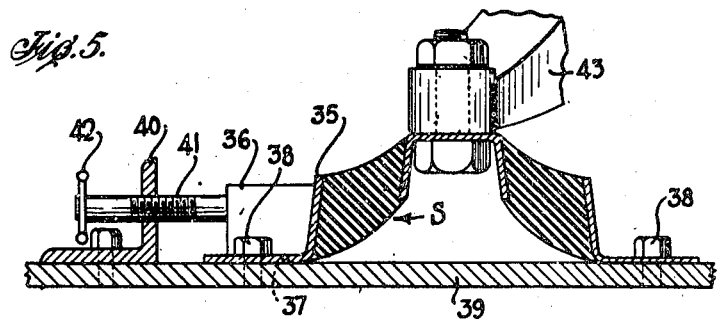

In the embodiment of the invention shown in Fig. 5 the resilient unit S differs from the resilient units of the other embodiments of the invention in that the angle strip on one side thereof, designated 35, is formed with a substantial boss 36, and is formed with transversely extending slots 37 for receiving the bolts or cap screws 38 by which that side of the unit is secured to a supporting structure 39. Secured to the latter in spaced relation to the angle strip 35 aforesaid is a bracket 40 having an upstanding portion through which is threaded an adjusting screw 41. The inner end of the latter is adapted to operate against the face of a boss 36 of the resilient unit, said face of said boss being perpendicular to the supporting structure, the outer end of the screw being provided with a knob 42 by which the screw is manually operated. A portion of the structure supported by the mounting is shown at 43. The arrangement provides adjustment means for varying the pre-compression of the mounting.

Figure 6:
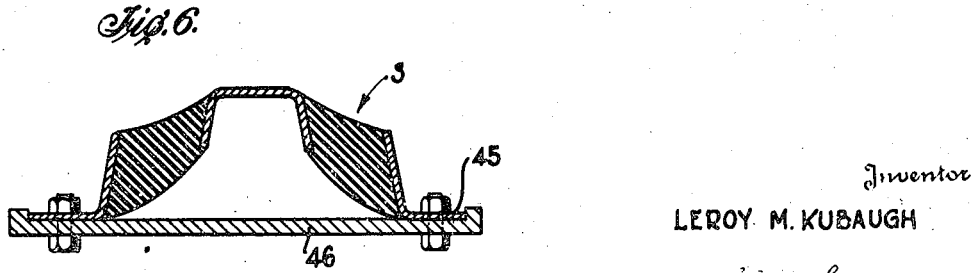

In the embodiment of the invention shown in Fig. 6 the resilient unit S is mounted in a shallow groove 45 in a supporting structure 46. The width of the groove 45 is less than the overall width of the unit S so that the positioning of the angle strips of the latter in said groove requires said strips to be forced toward each other with the result that determinate pre-compression is imparted to the rubber elements of the unit.

Other modifications may be resorted to without departing from the spirit of the invention, or the scope thereof as defined by the appended claims.

What is claimed is:

1. In a resilient mounting of the character described, the combination of a resilient unit comprising a pair of parallel spaced-apart, angular lateral strips each firmly attached to a supporting structure, an intermediate strip spaced between and somewhat offset from said lateral strips and attachable to a supported structure, and a pair of cushions of resilient material on opposite sides of said intermediate strip each bonded to one lateral face thereof and to the confronting face of a lateral strip, a bracket secured to the supporting structure at one side of the resilient unit, an adjusting screw threaded through said bracket and engaging one of the lateral strips of the resilient unit whereby said latter strip may be moved relatively of the other lateral strip when said other lateral strip is attached to said supporting structure, and attachment means adapted to retain said movable strip in adjusted positions along a transversely extending slot in said movable strip.

2. In a device of the character described, the combination of a pair of angular elements, one of which is fixed to a supporting structure and the other is slidably positioned thereon, a U-shaped element disposed between said angular elements and in elevated relation thereto, a pair of resilient members extending from the confronting faces of the angular elements to the outwardly presented faces of the U-shaped element and bonded to said faces to provide the sole positioning means for said U-shaped element, means operatively engaging said slidable angular element for adjusting the position thereof to place said resilient members under determinate compressive stress, and means for securing the slidable angular element to the supporting structure in all positions of adjustment thereon.

3. A resilient mounting of the character described having in combination, a supporting structure, a pair of spaced lateral strips attached thereto, an element positioned intermediate said lateral strips in spaced relation thereto, a pair of resilient elements disposed between the intermediate element and the respective lateral strips and bonded thereto, a bracket secured to the supporting structure at one side of the mounting, and a member threaded through said bracket and operatively engaging one of said lateral strips for adjusting the position thereof with relation to the other lateral strip, the means attaching the adjustable lateral strip to the supporting structure being operable in all positions of adjustment thereof.

LE ROY M. KUBAUGH.

REFERENCES CITED

The following references are of record in the file of this patent:

UNITED STATES PATENTS

| Number | Name | Date |
|---|---|---|
| 1,734,596 | Rosenzweig | Nov. 5, 1929 |
| 2,047,493 | Saurer | July 14, 1936 |
| 2,162,714 | Hamblin | June 20, 1939 |
| 2,175,784 | Rosenzweig | Oct. 10, 1939 |
| 2,189,708 | Toyne | Feb. 16, 1940 |
| 2,262,442 | Anderson | Nov. 11, 1941 |
| 2,359,941 | Rosenzweig | Oct. 10, 1944 |